United States Patent [19]

Souther

[11] Patent Number: 4,651,398
[45] Date of Patent: Mar. 24, 1987

[54] STRUT CONVERSION

[76] Inventor: William C. Souther, 415 E. Broadway, Farmington, N. Mex. 87401

[21] Appl. No.: 822,778

[22] Filed: Jan. 27, 1986

[51] Int. Cl.⁴ .................... B21K 21/16; F16F 7/00
[52] U.S. Cl. .................................. 29/401.1; 267/182
[58] Field of Search ............... 29/401.1, 426.2, 454, 29/156.5 R; 248/610; 267/182, 22 R; 188/266, 322.11

[56] References Cited

U.S. PATENT DOCUMENTS 4,261,446  4/1981  Bolger ............................. 29/401.1
4,567,637  2/1986  Pees et al. ....................... 29/401.1

Primary Examiner—Howard N. Goldberg
Assistant Examiner—Irene Graves Golabi
Attorney, Agent, or Firm—Kyle W. Rost

[57] ABSTRACT

An off-highway vehicle suspension system strut of the type employing rubber impact pads to provide damping is modified by conversion of the housing to accommodate a nitrogen-over-oil suspension system. The rubber pads are removed and the inner barrel is capped with a piston. The outer barrel is fitted with a gas inlet valve, and an interface between the two barrels is created by a combination of one-way and two-way valves. Appropriate wall sections in the two barrels are reinforced or replaced to create adequate strength for hydraulic operation, and the barrels are linked by a stop rod that permits limited telescopic movement.

11 Claims, 3 Drawing Figures

STRUT CONVERSION

BACKGROUND OF THE INVENTION

1. Field of the Invention

The invention generally relates to land vehicles and their suspension means, especially to fluid suspensions. A method and its resultant product apparatus are disclosed, wherein a rubber suspension is converted to a fluid suspension that employs substantially the same physical housing structure as the original rubber suspension.

2. Description of the Prior Art

Off-highway suspension systems are employed on large-scale vehicles such as trucks, scrapers, dozers, loaders, tow tractors, and pushers. This type of equipment is used, for example, in construction, mining, and quarry work. One of the suspension systems in such use, produced by Unit Rig & Equipment Co. of Tulsa, Oklahoma, provides a suspension tube that is filled with stacked rubber impact pads, which provide ride damping. Another type of suspension system is the gas or hydro-strut, which employs an oil-filled suspension tube with nitrogen gas over the oil.

The rubber-damped type of strut is considered by many equipment operators to be too harsh. When used with off highway mining haul trucks, the rubber-damped strut, the ride is hard when the truck is loaded, and there is very little travel or ability to absorb shocks. The condition is similar or worse when the truck is empty, and due to excessive vibration, the life of many components is shortened. Vehicle frames have developed problems, and drivers often complain about the vibrations. However, once a vehicle is equipped with such a strut, the high cost of such a large strut prohibits change-over to the hydro-strut, as a single strut may have a cost on the order of twenty thousand dollars. Accordingly, there is a strong incentive to convert the rubber-damped type of strut into a hydro-strut, as this conversion can offer the damping characteristics of the latter without requiring a complete change of suspension components. A conversion of the type suggested herein can be achieved for a fraction of the price of a new strut and thereby offers an economic justification as well as a performance justifiction.

The end product is similar to a variety of known struts or shock absorbers that employ an oil and gas combination to achieve damping. For example, U.S. Pat. No. 2,914,337 to Kress discloses a suspension structure in which oil and gas filled chambers provide the required damping. U.S. Pat. No. 3,387,856 to Guilhamat et al discloses a hydro-pneumatic suspension system in which a compressed gas and a lubricating fluid operate in separate chambers. Hydro-pneumatic shock absorbers are disclosed in U.S. Pat. Nos. 2,440,353 to Wallace and 3,348,703 to Powell et al. A hydro-pneumatic suspension system especially adapted to high capacity vehicles is shown in U.S. Pat. No. 3,820,818 to Kress et al.

While conversion of rubber to oil damped suspension is believed new, some art is known in the area of altering and renewing sealed struts. For example, U.S. Pat. No. 4,261,446 to Bolger teaches a conversion of a sealed strut to one able to receive a shock absorber cartridge insert. Also of interest is U.S. Pat. No. Re. 31,212, which teaches a strut assembly designed to receive replacement shock absorbers. The referenced art shows the desirability of renewing the capability of struts. At the same time, the art demonstrates that renewal has consisted of rebuilding a strut according to its original structure or replacing a cartridge assembly. Conversion of between different inner damping media has not been suggested but offers a new capability.

To achieve the foregoing and other objects and in accordance with the purpose of the present invention, as embodied and broadly described herein, the strut and method of manufacture of this invention may comprise the following.

SUMMARY OF THE INVENTION

Against the described background, it is therefore a general object of the invention to provide an improved method for replacing rubber impact pad damped suspension systems with nitrogen-over-oil suspension systems.

More specifically, it is an object of the invention to convert the existing physical housing that is employed in rubber impact pad damped suspensions into a nitrogen-over-oil suspension.

A further specific object is to convert a portion of the physical housing of the rubber impact pad damped suspension to sufficiently modified form to withstand hydraulic pressures as are encountered with an nitrogen-over-oil suspension, while retaining a substantial portion of the housing in unmodified form.

Another object is to develop an economical method for converting existing suspension systems between the rubber damped type and the oil damped type, such that it is unnecessary and impractical to discard the former type of strut when conversion to the latter is desired.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a method of converting a rubber impact pad damped suspension strut into an nitrogen-over-oil type of suspension strut is provided. The former is formed of an outer barrel carrying a top cap, a plunger tube telescoped within the outer barrel for reciprocating movement and defining in combination with the outer barrel an interior chamber, a wheel spindle and steering arm carried from the plunger tube, a means for preventing separation of the outer barrel and plunger tube, and a plurality of impact pads in stacked arrangment within the interior chamber for damping telescoped compression between the outer barrel and plunger tube. This known suspension is converted by, first, removing the impact pads from the interior chamber. Subsequently, a piston means is installed on the plunger tube for defining within the plunger tube an inner chamber and defining within the outer barrel an outer chamber. A slidable oil seal is provided between the outer barrel and plunger tube to define a limit of the outer chamber. A closure means is provided in the plunger tube at a spaced distance below the piston to define a limit of the inner chamber. A one-way valve means is provided between the inner chamber and outer chamber for permitting outflow of oil from the inner chamber; and a two-way passage means is provided between the inner chamber and outer chamber for permitting bi-directional flow of oil between the inner and outer chambers.

By these modifications, the existing physical housing of a rubber damped suspension system is converted to the nitrogen-over-oil type, which is a highly desirable alteration that is overly costly to be undertaken when the original suspension system must be entirely replaced.

The accompanying drawings, which are incorporated in and form a part of the specification illustrate preferred embodiments of the present invention, and together with the description, serve to explain the principles of the invention. In the drawings:

DESCRIPTION OF THE PREFERRED EMBODIMENT

Figure 1:
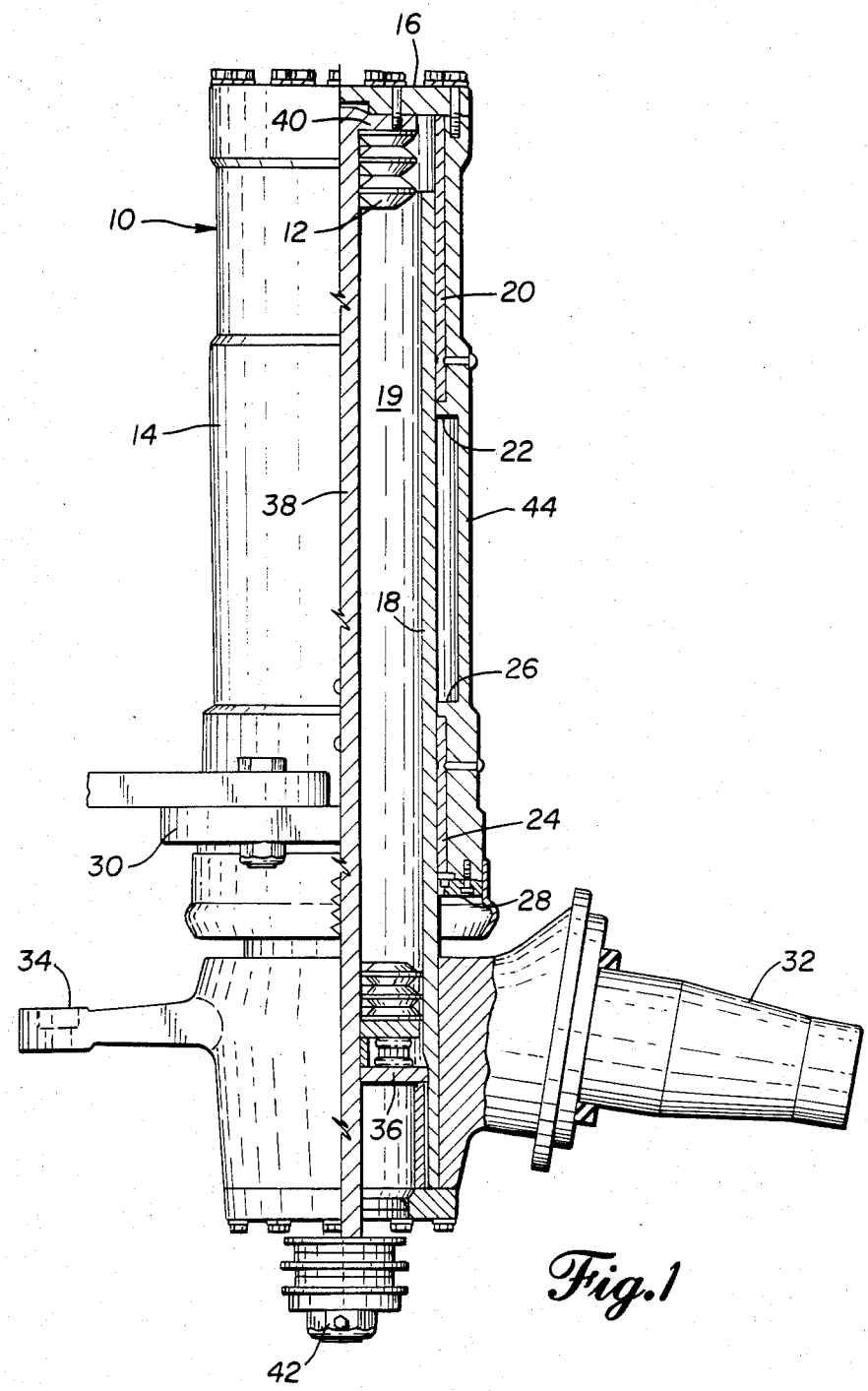
FIG. 1 is a side view of a rubber-damped suspension system strut, partially broken away through the strut portion to show interior structure.

According to the process of the invention, and referring generally to the typical prior art suspension strut 10 of FIG. 1, a strut of the type manufactured by Unit Rig & Equipment Co. under the trademarks MK-33, MK-36, M-85, M-100, M-120, M-200 is modified to remove its contained rubber impact pads 12 and the suspension strut then is converted to a nitrogen-over-oil type of syspension, which will be referred to as a hydro-strut. The conversion involves a reconfiguration of the suspension strut, while preserving the major part of the original physical structure in order to produce the hydro-strut at a minor fraction of the cost of a replacement or original equipment type of hydro-strut.

In the original suspension strut 10, an outer barrel 14 carries a top cap 16, which seals the top of the outer barrel and retains the impact pads 12. The outer barrel has a cylindrical inside profile and carries a cylindrical inner barrel or plunger tube 18 in telescoped relationship within the outer barrel for reciprocating movement. When the outer barrel and plunger tube are in telescoped relationship, an inner chamber 19 is defined that is capable of containing the rubber impact pads 12. An upper bushing 20 is mounted on the inside face of the outer barrel 14, between a flange 22 and the top cap, and carries the inner barrel for sliding movement. A lower bushing 24 is mounted on the inside face of the outer barrel 14 between a flange 26 and a lower seal 28 attached to the open edge of the outer barrel. The bushings may be greased to reduce friction. On the outer surface of the outer barrel, a frame mounting 30 provides an attachment point to the vehicle.

The inner barrel is connected to a casting that carries a wheel spindle 32 on one lateral side and carries a steering arm 34 on approximately the opposite lateral side. The inner barrel includes a bottom transverse wall 36 forming a lower face that opposes the top cap 16 to further retain the rubber inpact pads 12.

Inside the strut 10, a guide rod 38 extends from the top cap 16 through the bottom wall 36 in a sliding relationship. The guide rod serves as a means for preventing separation of the outer barrel and plunger tube, as well as guiding the telescopic motion of the two sliding components during operation of the strut. At the top of the guide rod is fastened a radial disc 40 that retains the guide rod. The rubber impact pads 12 are arranged in columns within the strut volume defined between the top cap 16, bottom wall 36, and inside diameter of the inner barrel, where the pads damp the compression of the strut. The guide rod 38 extends below the bottom wall 36 for a substantial distance to an end retainer 42, which may be a nut and removable washer. Between the end retainer and wall 36, the guide rod carries one or more impact pads 12 as rebound dampers that act to damp extension of the strut.

Figure 2:
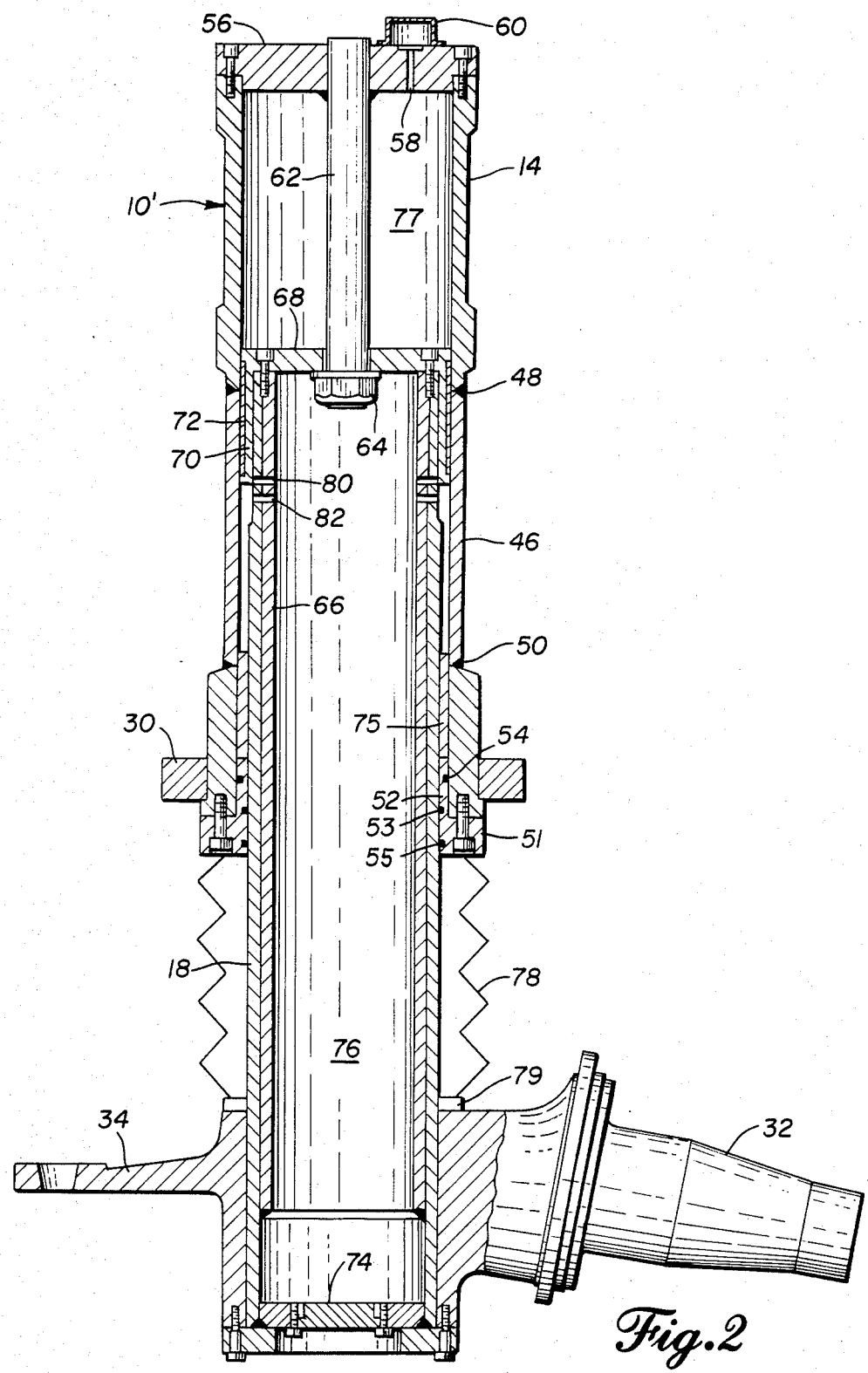
FIG. 2 is a view similar to FIG. 1, showing the strut portion partially broken away.
Figure 3:
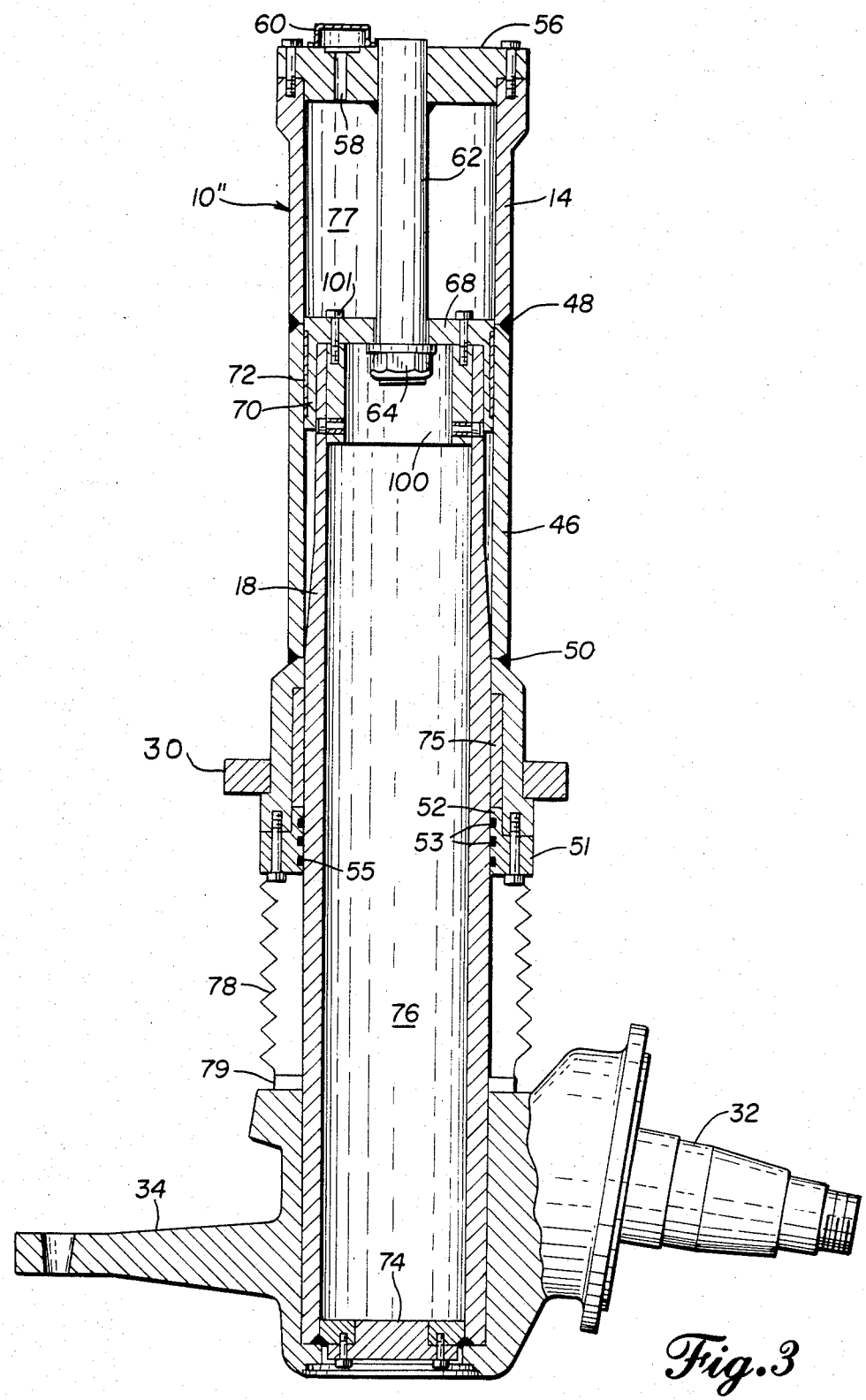
FIG. 3 is a view similar to FIG. 1, showing a modified form of strut partially broken away.

The described strut 10 is converted to a hydro-strut unit 10' as shown in FIGS. 2 and 3 by effecting the following changes. First, the strut 10 is dissassembled by removing the top cap 16 and retainer 42, which enables the guide rod 38 and rubber impact pads 12 to be removed. The inner and outer barrel assemblies are then capable of being separated and individually modified.

The outer barrel must be modified to accommodate hydraulic pressure. This is done by removing the cylindrical center section 44 of the outer barrel, which essentially is that part from top flange 22 to lower flange 26. The upper bushing 20 also is eliminated. A cylindrical side wall replacement 46 of similar inside diameter but having a side wall of increased thickness with respect to the removed section then is welded in place, such as at welds 48 and 50. The heavier material of the repleacment section 46 thereby is made a part of the outer barrel, while the structure of the existing adaptable portions of the outer barrel, consisting of the upper and lower ends of the outer barrel and the frame mounting 30, are preserved and utilized in the end product 10'.

The lower end of the outer barrel is machined to accommodate a stuffing box 51, which is newly added to the strut. The stuffing box includes an annular carrier means that fits against the lower face of the outer barrel and is attached in place to the outer barrel by a suitable screw fastener. The carrier means includes an annular flange 52 that extends upwardly from the carrier and closely fits within the inside diameter of the outer barrel. This flange carries a plurality of slidable seal means 53 and static seal means 54, such as two of each, axially spaced apart. The static seals, which may be o-rings, are lodged in grooves in the radially outward face of the flange 52 and are compressed against the inner face of the outer barrel. The slidable seal means 53, which may be of the type known by the trade mark, Poly Pak seals, are lodged in grooves on the radially inside face of the flange 52 and are compressed between the inner face of the flange and the outer face of the inner barrel. The stuffing box retains hydraulic oil against loss out the sliding junction between the inner and outer barrels. A wiper 55 may be carried in a lower groove of the stuffing box, where it is applied against the outer surface of the inner barrel immediately above the stuffing box.

A new top cap 56 is installed on the upper end of the outer barrel. This cap, which is held in place by capscrews, includes a charge valve hole 58, which may carry a gas valve such as a Schraeder valve. A guard 60 covers the charge valve hole. The valve provides a means for charging the strut with nitrogen or other gas. The new top cap 56 has a depending core that closely fits within the inner diameter of the outer barrel. The core carries suitable seals such as o-rings on its radially outward face to seal against the inside diameter of the outer barrel and retain hydraulic oil. The top cap also carries a stop rod 62 depending along the centerline of the outer barrel. The stop rod carries a retainer such as a nut and washer assembly 64 at its lower end, which will be engaged in the inner barrel. The stop rod is preferred to be firmly fastened to the top cap, such as by welding, and is substantially shorter than the guide rod 38 that it replaces, often being approximately one-fourth the length of the strut or original guide rod.

The inner barrel or plunger tube 18 is modified according to the requirements of the specific configuration of the tube. In the embodiment of FIG. 2, which refers specifically to the Unit Rig strut designated as MK-33, MK-36 and M-200, a reinforcing sleeve 66 is pressed into the plunger tube to strengthen it against hydraulic pressure. The sleeve is inserted with a press fit, such as a 0.004 inch clearance, and welded in place at the top and bottom of the plunger tube. The modified plunger tube will be referred to as the plunger tube assembly.

A piston means, such as piston 68 having a depending side skirt 70 is placed over the top end of the plunger tube assembly with the piston skirt overlapping the wall of the tube, and the piston is fastened in place, such as by screw fasteners lodged through the top face of the piston and into the top end edge of the plunger tube assembly. The outside face of the depending skirt 70 may carry a phenolic bearing 72 that slides against the inside face of the outer barrel. The top end of the piston receives the stop rod 62 through an aperture in a loose fit that permits passage of hydraulic oil. The retaining nut and washer assembly 64 on the lower end of the stop rod is below the top face of the piston and limits the downward movement of the plunger tube assembly and piston with respect to the outer barrel. A closure means such as retainer plate 74 is attached to the lower end of the plunger tube assembly, such as by welding, and defines a lower limit of the oil-containing volume of the plunger tube.

When the converted strut is assembled, the plunger tube assembly is telescoped within the outer barrel, with a lower bushing 75 acting between the plunger tube assembly and outer barrel in the area immediately above the stuffing box. It may be noted that the lower bushing 75 and the piston bearing 72 differ from the original bushings 20 and 24 by their superior lateral pressure resistance. The outer barrel and plunger tube assembly are retained from over extension by means such as the stop rod 62 and retainer 64. The volume defined within the retainer plate 74, piston 68, and inside wall of the plunger tube assembly forms an inner or lower chamber 76 of the strut. The volume within the outer barrel and external of the plunger tube assembly forms the outer or upper chamber 77. The outside surface of the plunger tube assembly below the outer barrel is protected from dirt by a boot 78 that extends between the bottom of the outer barrel and a rubber stop ring 79 carried on the casting that forms the spindle and steering arm.

The plunger assembly is provided with both one-way valve means and two-way passage means for permitting hydraulic oil to move between the inner and outer chambers during operation of the strut. For example, the walls of the plunger tube assembly are drilled to receive check valves 80 and to define orifice holes 82. The valves and orifices are located below the piston skirt, in the portion of the plunger tube wall that is opposed by the outer chamber 77. The check valves, which may be of the ball check type, allow hydraulic oil to pass from the inner chamber 76 to the outer chamber 77 on the retract stroke of the strut. However, the oil is prevented from returning through the ball check valves during the extend stroke. The orifices 82 serve as transfer means for allowing oil to pass either way. Thus, the operation of the converted strut is such that damping occurs whenever the strut is caused to extend or retract.

In FIG. 3, where similar parts carry similar numbers, another version of the original rubber-damped strut is shown in converted form as strut 10". This type of strut is converted from the Unit Rig M-85, M-100, and M-120 suspension system. As previously described, the outer barrel 14 has its center section 44 removed and replaced with a section 46 of increased thickness, and a new top cap 56 with stop rod 62, lower bushing 75, and stuffing box 51 are added. The inner barrel or plunger tube 18 of the unconverted strut is reconfigured by addition of a sleeve 100 only at its upper end, and this sleeve carries the piston 68. Check valves 80 and orifice holes 82 are added through the portion of the plunger tube containing the sleeve 100. As shown in the drawing, the sleeve provides a mounting location to receive screws that fasten the piston 68 to the top of the plunger tube assembly. A retainer plate 74 closes the bottom of the plunger tube. The assembled strut includes both a lower bushing 75 and a piston guide bearing 72 similar to those used in the strut of FIG. 2.

The modifications as specified preserve the structural components of the original rubber-damped suspension system 10. In operation, the modified struts receive hydraulic oil in the inner chamber and are charged with nitrogen gas in the outer chamber through valve 58. The casting that carries the steering arm 34 and spindle 32 is substantially unchanged; the plunger tube 18 is modified to strengthen it against hydraulic pressure and to permit the necessary passage of oil between the inner and outer chambers; and the outer barrel is similarly strengthened to accommodate hydraulic pressure and to operate in the environment of oil and nitrogen gas. The converted strut 10' or 10" has the operating characteristics of the known type of suspension system employing nitrogen over oil, while requiring only the reworking as specified.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The embodiments of the invention in which an exclusive property or privilege is claimed are defined as follows:

1. The method of converting a rubber impact pad damped suspension strut into an nitrogen-over-oil type of suspension strut, wherein the former is formed of an outer barrel carrying a top cap, a plunger tube telescoped within the outer barrel for reciprocating movement and defining in combination with the outer barrel an interior chamber, a wheel spindle and steering arm carried from the plunger tube, a means for preventing separation of the outer barrel and plunger tube, and a plurality of impact pads in stacked arrangment within said interior chamber for damping telescoped compression of the outer barrel and plunger tube, wherein the method of conversion comprises:

removing said impact pads from the interior chamber;

installing a piston means on said plunger tube for defining within the plunger tube an inner chamber and defining within the outer barrel an outer chamber;

providing a slidable oil seal between the outer barrel and plunger tube to define a limit of said outer chamber;

providing a closure means in said plunger tube at a spaced distance below said piston to define a limit of said inner chamber;

providing a one-way valve means between the inner chamber and outer chamber for permitting outflow of oil from the inner chamber; and providing a two-way passage means between the inner chamber and outer chamber for permitting bi-directional flow of oil between the inner and outer chambers.

2. The method of claim 1, further comprising:
removing a cylindrical section of said outer barrel; and
subsequently adding in place of said removed cylindrical section another cylidrical section similar inner diameter and of greater wall strength for resisting hydraulic pressure.

3. The method of claim 2, further comprising:
pressing into the inside diameter of said plunger tube a reinforcing sleeve for strengthening the plunger tube against hydraulic pressure.

4. The method of claim 1, wherein said slidable oil seal comprises:
a carrier means attached to the end of said outer barrel telescoping the plunger tube, wherein the carrier means includes a slidable seal means applied between the carrier means and the plunger tube and a static seal means applied between the carrier means and the outer barrel.

5. The method of claim 1, wherein said step of providing a slidable oil seal comprises:
removably attaching to the end of said outer barrel that telescopes the plunger tube a carrier means having a slidable seal means applied beteen the carrier means and the plunger tube and a static seal means applied between the carrier means and the outer barrel.

6. The method of claim 1, further comprising:
providing a gas charge valve means in a wall of said outer chamber.

7. The method of claim 1, further comprising:
providing a movement limiting means acting between said outer barrel and plunger tube, wherein said movement limiting means comprises a rod fixedly attached to the outer barrel and slidably received through said piston means, the rod further including a stop actuatable against the piston means at a predetermined degree of separation between the outer barrel and piston means.

8. The method of converting a rubber impact pad damped suspension strut into an nitrogen-over-oil type of suspension strut, wherein the former includes a housing formed from telescoped cylindrical inner and outer barrel portions that together define an interior chamber, at least one of said barrel portions having a side wall strength inadequate for hydraulic operation, the outer barrel having a closed end and an open end, the inner barrel having an open end that is telescoped within the outer barrel for reciprocating movement, a wheel spindle and steering arm being connected to the plunger tube, a means for preventing separation of the inner and outer barrels being connected between them, and a plurality of impact pads being stacked in columns within said interior chamber for damping telescoped compression of between the inner and outer barrels, wherein the method of conversion comprises:

removing the rubber impact pads from the interior chamber;

fastening a piston to said open end of said inner barrel and thereby defining within the inner barrel an inner chamber separated from the outer barrel and capable of containing hydraulic oil;

attaching a slidable oil seal to said open end of the outer barrel in a position contacting the outer surface of the inner barrel when the barrels are telescoped and defining an outer chamber within the outer barrel and separated from said inner chamber;

providing a one-way valve means between the inner chamber and outer chamber for, in use, permitting outflow of oil from the inner chamber to the outer chamber during extension of the telescoped barrels;

providing a two-way passage means between the inner chamber and outer chamber for permitting, in use, bi-directional flow of oil between the inner and outer chambers;

providing a gas inlet means in said outer barrel for, in use, admitting nitrogen gas into said outer chamber; and connecting the inner and outer barrels in telescoped relationship by a stop means for allowing limited relative reciprocal motion therebetween while preventing disengagement of the telescoped barrels.

9. The method of claim 8, further comprising:
providing hydraulic oil into said inner chamber; and
charging nitrogen gas through said gas inlet means into said outer chamber.

10. The method of claim 8, wherein said inner barrel lacks adequate strength for hydraulic operation, further comprising:
lining the inner barrel with an interior sleeve in press-fit relationship to reinforce the cylindrical side wall; and
welding said sleeve to the inner barrel at each opposite end of the sleeve.

11. The method of claim 8, wherein a cylindrical portion of said outer barrel lacks adequate strength for hydraulic operation, further comprising:
removing said cylindrical portion of the outer barrel;
providing a replacement cylindrical portion of greater wall strength and substantially similar interior diameter; and
welding said replacement portion to the remaining part of the outer barrel.

* * * * *